US012718164B2

(12) United States Patent
Yonaha

(10) Patent No.: US 12,718,164 B2
(45) Date of Patent: Aug. 25, 2026

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventor: Makoto Yonaha, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 528 days.

(21) Appl. No.: 17/819,388

(22) Filed: Aug. 12, 2022

(65) Prior Publication Data

US 2022/0383487 A1 Dec. 1, 2022

Related U.S. Application Data

(63) Continuation of application No. PCT/JP2021/002200, filed on Jan. 22, 2021.

(30) Foreign Application Priority Data

Mar. 2, 2020 (JP) ................................ 2020-035172

(51) Int. Cl.
*G06T 7/00* (2017.01)
*G06T 5/50* (2006.01)
(Continued)

(52) U.S. Cl.
CPC .............. *G06T 7/0004* (2013.01); *G06T 5/50* (2013.01); *G06T 7/70* (2017.01); *G06T 17/10* (2013.01)

(58) Field of Classification Search
CPC ......... G06T 7/0004; G06T 7/75; G06T 17/10; G06T 2210/00; G06T 7/30; G06T 5/50; G06T 7/70–75
See application file for complete search history.

(56) References Cited

U.S. PATENT DOCUMENTS 10,832,476 B1 * 11/2020 Nussbaum ........... G06V 20/653
2011/0050888 A1 * 3/2011 Shibukawa ........ H04N 1/00411 348/135

(Continued)

FOREIGN PATENT DOCUMENTS

CA 3062477 A1 * 12/2018 ........... G06T 7/0012
CN 110462678 A 11/2019

(Continued)

OTHER PUBLICATIONS

An Office Action; “Notice of Reasons for Refusal,” mailed by the Japanese Patent Office on Jan. 10, 2024, which corresponds to Japanese Patent Application No. 2022-505021 and is related to U.S. Appl. No. 17/819,388; with English language translation.

(Continued)

*Primary Examiner* — Vu Le
*Assistant Examiner* — Jack Peter Kraynak
(74) *Attorney, Agent, or Firm* — Studebaker Brackett PLLC

(57) ABSTRACT

An image processing apparatus includes a processor, and a memory storing a plurality of images obtained by capturing images of a building and a three-dimensional model of the building in which members constituting the building are specified, the plurality of images and the members being stored in association with each other. The processor is configured to perform an extraction process to extract defect information of the building on the basis of the plurality of images, a selection process to select an image corresponding to a designated member from among the plurality of images in accordance with a designated criterion, and an output process to output the designated member, the selected image, and the defect information in association with each other.

18 Claims, 13 Drawing Sheets

(51) Int. Cl.
*G06T 7/70* (2017.01)
*G06T 17/10* (2006.01)

(56) References Cited

U.S. PATENT DOCUMENTS

2012/0057846 A1 3/2012 Takagi
2018/0012394 A1* 1/2018 Averianov .............. G06T 15/04
2018/0300868 A1 10/2018 Kikuchi
2018/0322699 A1* 11/2018 Gray ........................ G08G 5/55
2018/0373931 A1 12/2018 Li
2019/0026955 A1* 1/2019 Ogata ..................... G06T 7/579
2019/0156531 A1* 5/2019 Vallapuzha .......... G01N 21/954
2019/0385275 A1* 12/2019 Kikuchi ................. H04N 1/387
2020/0074730 A1* 3/2020 Shloosh ................. G06V 20/17
2020/0279364 A1* 9/2020 Sarkisian .............. G06F 16/252
2020/0279367 A1* 9/2020 White ...................... G06N 3/08
2020/0294308 A1* 9/2020 Hasegawa ............. G06T 7/0004
2021/0056753 A1* 2/2021 Yasar ....................... G06N 7/01
2021/0110618 A1* 4/2021 Jalla ........................ G06F 30/13
2022/0405878 A1* 12/2022 Kikuchi .................... G06T 5/50

FOREIGN PATENT DOCUMENTS

JP 2006-172090 A 6/2006
JP 2011-070632 A 4/2011
JP 2011192270 A * 9/2011
JP 2012-060239 A 3/2012
JP 2014-115915 A 6/2014
JP 2017-167969 A 9/2017
JP 2017-168077 A 9/2017
JP 2018181235 A * 11/2018
JP 2019082933 A * 5/2019
JP 2019-174982 A 10/2019
JP 2020-030519 A 2/2020
WO 2017/119202 A1 7/2017

OTHER PUBLICATIONS

Leshko Brian J., "Guidelines for Inspecting Complex Components of Bridges", Jan. 1, 2015, pp. 1-80, https://onlinepubs.trb.org/onlinepubs/nchrp/docs/NCHRP20-07(337)_FR.pdf.
Dorafshan Sattar et al., "Bridge inspection: human performance, unmanned aerial systems and automation", Journal of Civil Structural Health Monitoring, vol. 8, No. 3, May 21, 2018, pp. 443-476, Springer, doi: 10.1007/s13349-018-0285-4.
Sacks Rafael et al., "SeeBridge as next generation bridge inspection: Overview, Information Delivery Manual and Model View Definition", Automation in Construction, vol. 90, Feb. 24, 2018, pp. 134-145, Elsevier, doi: 10.1016/J.AUTCON.2018.02.033.
The extended European search report issued by the European Patent Office on Aug. 9, 2023, which corresponds to European Patent Application No. 21765299.9-1210 and is related to U.S. Appl. No. 17/819,388.
International Search Report issued in PCT/JP2021/002200; mailed Apr. 6, 2021.
International Preliminary Report on Patentability (Chapter I) and Written Opinion of the International Searching Authority issued in PCT/JP2021/002200; issued Sep. 6, 2022.
An Office Action; mailed by the China National Intellectual Property Administration of the People's Republic of China on Sep. 4, 2024, which corresponds to Chinese Patent Application No. 202180013765.7 and is related to U.S. Appl. No. 17/819,388.
An Office Action; "Notice of Reasons for Refusal," mailed by the Japanese Patent Office on Jun. 16, 2026, which corresponds to Japanese Patent Application No. 2025-149135 and is related to U.S. Appl. No. 17/819,388; with English language translation.

* cited by examiner

FIG. 8

| MEMBER | TYPE OF DEFECT | DIMENSIONS OF DEFECT | DEGREE OF DEFECT | CHANGE OVER TIME |
|---|---|---|---|---|
| PIER ○○1 | CRACKING | L=1.0m | a | +0.1m, a⇒a |
| PIER ○○1 | CRACKING | L=2.1m | b | +0.3m, a⇒b |
| PIER ○○2 | FREE LIME | L=0.5m | c | +0m, c⇒c |
| FLOOR SLAB ○○1 | FREE LIME | L=1.0m | d | +0.2m, c⇒d |
| FLOOR SLAB ○○2 | SCALING | $S=1m^2$ | a | $+0.25m^2$, a⇒a |
| MAIN GIRDER ○○1 | REINFORCEMENT EXPOSURE | L=0.5m | d | +0.15m, c⇒d |
| MAIN GIRDER ○○2 | BLISTERING | – | d | ±0, d⇒d |
| ABUTMENT ○○2 | SCALING | $S=0.5m^2$ | d | $+0.2m^2$, d⇒d |
| ABUTMENT ○○2 | WATER LEAK | L=3m | a | ±0m, a⇒a |
| MAIN GIRDER ○○1 | CORROSION | $S=3m^2$ | c | $+0.4m^2$, c⇒c |

FIG. 9

OUTPUT FORM OF PROCESSING RESULT
TWO-DIMENSIONAL INSPECTION REPORT DISPLAY MODE
ON
OFF
THREE-DIMENSIONAL MODEL DISPLAY MODE
ON
OFF
DISPLAY OF REPRESENTATIVE IMAGES
INITIALLY
PIN DESIGNATION TIME
COMPOSITE IMAGE MAPPING
ON
OFF
HIGHLIGHTING OF DEFECTS
ON
OFF
DISPLAY OF TWO-DIMENSIONAL INSPECTION REPORT ON THREE-DIMENSIONAL MODEL
ON
OFF
OK
CANCEL

FIG. 11

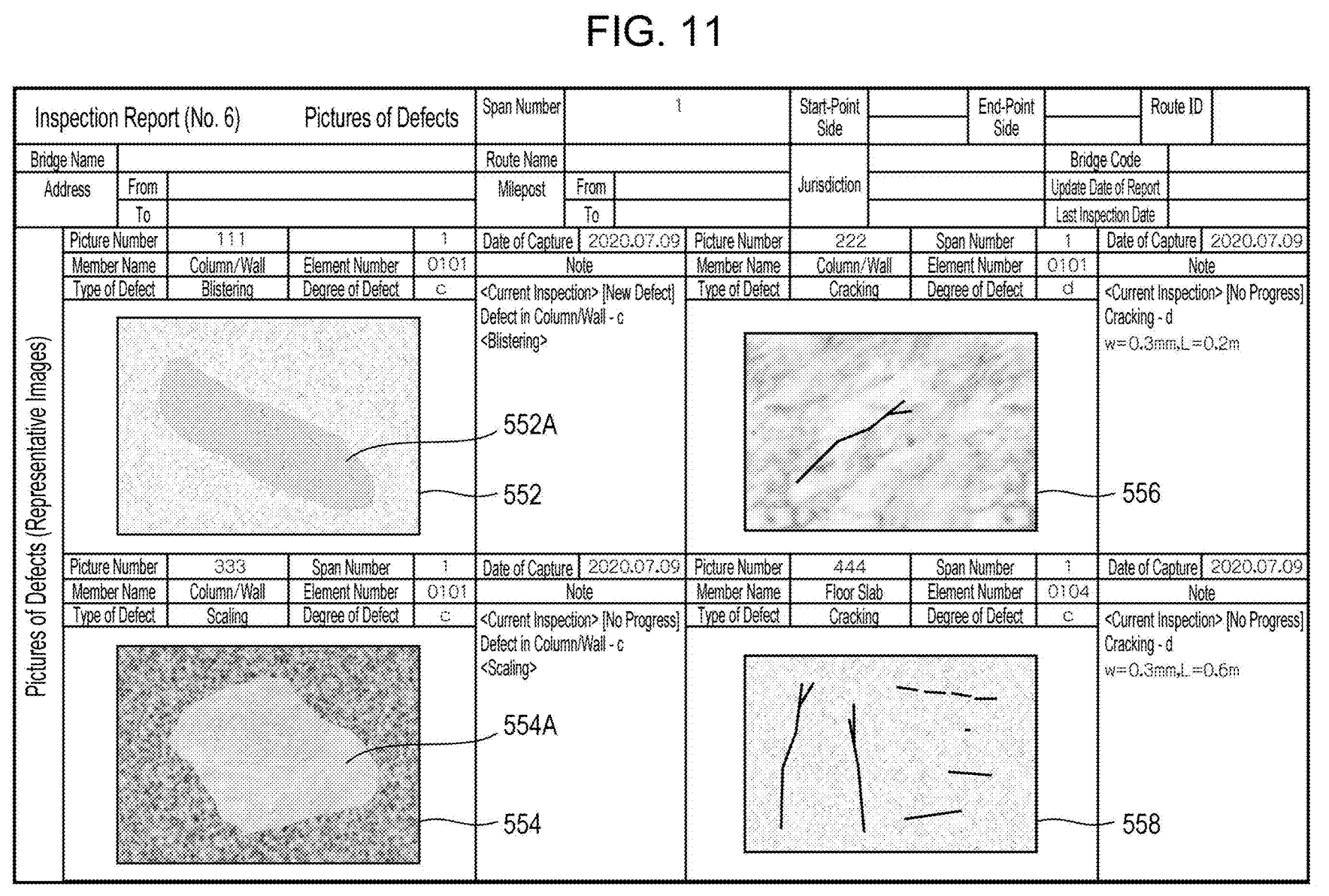

| Inspection Report (No. 6) Pictures of Defects | | | | Span Number | 1 | | Start-Point Side | | End-Point Side | | Route ID | |
|---|---|---|---|---|---|---|---|---|---|---|---|---|
| Bridge Name | | | | Route Name | | | Jurisdiction | | | | Bridge Code | |
| Address | From | | | Milepost | From | | | | | | Update Date of Report | |
| | To | | | | To | | | | | | Last Inspection Date | |

Pictures of Defects (Representative Images)

| Picture Number | 111 | | 1 | Date of Capture | 2020.07.09 |
|---|---|---|---|---|---|
| Member Name | Column/Wall | Element Number | 0101 | Note | |
| Type of Defect | Blistering | Degree of Defect | c | <Current Inspection> [New Defect]<br>Defect in Column/Wall - c<br><Blistering> | |

552A
552

| Picture Number | 222 | Span Number | 1 | Date of Capture | 2020.07.09 |
|---|---|---|---|---|---|
| Member Name | Column/Wall | Element Number | 0101 | Note | |
| Type of Defect | Cracking | Degree of Defect | d | <Current Inspection> [No Progress]<br>Cracking - d<br>w=0.3mm,L=0.2m | |

556

| Picture Number | 333 | Span Number | 1 | Date of Capture | 2020.07.09 |
|---|---|---|---|---|---|
| Member Name | Column/Wall | Element Number | 0101 | Note | |
| Type of Defect | Scaling | Degree of Defect | c | <Current Inspection> [No Progress]<br>Defect in Column/Wall - c<br><Scaling> | |

554A
554

| Picture Number | 444 | Span Number | 1 | Date of Capture | 2020.07.09 |
|---|---|---|---|---|---|
| Member Name | Floor Slab | Element Number | 0104 | Note | |
| Type of Defect | Cracking | Degree of Defect | c | <Current Inspection> [No Progress]<br>Cracking - d<br>w=0.3mm,L=0.6m | |

558

552

552A

[Legend]
○: Blistering
◎: Scaling
●: Reinforcement Exposure
★: Cracking

554

IMAGE PROCESSING APPARATUS, IMAGE PROCESSING METHOD, AND IMAGE PROCESSING PROGRAM

CROSS-REFERENCE TO RELATED APPLICATIONS

This application is a Continuation of PCT International Application No. PCT/JP2021/002200 filed on Jan. 22, 2021, which claims priority under 35 U.S.C § 119(a) to Japanese Patent Application No. 2020-035172 filed on Mar. 2, 2020. Each of the above application(s) is hereby expressly incorporated by reference, in its entirety, into the present application.

BACKGROUND OF THE INVENTION

1. Field of the Invention

The present invention relates to a technique for handling captured images of a building, a three-dimensional model of the building, and defect information.

2. Description of the Related Art

An apparatus related to a technology for handling a three-dimensional model and defect information of a building is described in, for example, JP2011-192270A. The apparatus is for creating a diagram for managing a structure (building or architectural object) such as a bridge.

SUMMARY OF THE INVENTION

An embodiment according to a technique disclosed herein provides an image processing apparatus, an image processing method, and an image processing program that provide easy handling of captured images of a building, a three-dimensional model of the building, and defect information.

An image processing apparatus according to a first aspect of the present invention is an image processing apparatus including a processor and a memory storing a plurality of images obtained by capturing images of a building and a three-dimensional model of the building in which members constituting the building are specified, the plurality of images and the members being stored in association with each other. The processor is configured to perform an extraction process to extract defect information of the building on the basis of the plurality of images; a selection process to select an image corresponding to a designated member from among the plurality of images in accordance with a designated criterion; and an output process to output the designated member, the selected image, and the defect information in association with each other.

An image processing apparatus according to a second aspect is the image processing apparatus according to the first aspect, in which the processor is configured to perform a generation process to generate the three-dimensional model of the building on the basis of the plurality of images; a specifying process to specify the members constituting the building in the generated three-dimensional model; and a storage control process to store the three-dimensional model in the memory in such a manner that the plurality of images and the specified members are associated with each other.

An image processing apparatus according to a third aspect is the image processing apparatus according to the second aspect, in which the processor is configured to perform the specifying process without an operation of a user specifying the members.

An image processing apparatus according to a fourth aspect is the image processing apparatus according to any one of the first to third aspects, in which the processor is configured to perform a reception process to receive designation of the criterion.

An image processing apparatus according to a fifth aspect is the image processing apparatus according to any one of the first to fourth aspects, in which the processor is configured to extract at least one of a type of a defect, the number of defects, a size of the defect, a degree of the defect, or a change in the degree of the defect over time as the defect information in the extraction process.

An image processing apparatus according to a sixth aspect is the image processing apparatus according to any one of the first to fifth aspects, in which the processor is configured to select an image for each type of defect in the selection process.

An image processing apparatus according to a seventh aspect is the image processing apparatus according to any one of the first to sixth aspects, in which the processor is configured to select a specified number of images in the selection process.

An image processing apparatus according to an eighth aspect is the image processing apparatus according to any one of the first to seventh aspects, in which the processor is configured to perform an image arrangement process to arrange the selected image in an area designated as an image area in a document file having a designated format.

An image processing apparatus according to a ninth aspect is the image processing apparatus according to the eighth aspect, in which the processor is configured to perform an information input process to input the defect information to an area designated as an information area in the document file.

An image processing apparatus according to a tenth aspect is the image processing apparatus according to any one of the first to ninth aspects, in which the processor is configured to perform a first display process to cause a display device to display the three-dimensional model and position information indicating a position of the selected image in the three-dimensional model in association with each other; and a second display process to cause the display device to display the selected image for designated position information among pieces of the displayed position information.

An image processing apparatus according to an eleventh aspect is the image processing apparatus according to any one of the first to tenth aspects, in which the processor is configured to perform a first display process to cause a display device to display the three-dimensional model and position information indicating a position of the selected image in the three-dimensional model in association with each other; and a third display process to cause the display device to display the selected image for the displayed position information.

An image processing apparatus according to a twelfth aspect is the image processing apparatus according to the tenth or eleventh aspect, in which the processor is configured to distinguishably display the position information in a form corresponding to the defect information at least in the first display process.

An image processing apparatus according to a thirteenth aspect is the image processing apparatus according to any one of the tenth to twelfth aspects, in which the processor is configured to, at least in the first display process, combine images corresponding to the specified members among the plurality of images to produce a combined image, and cause the display device to display the combined image with mapping to the specified members.

An image processing apparatus according to a fourteenth aspect is the image processing apparatus according to any one of the tenth to thirteenth aspects, in which the processor is configured to highlight the defect information in the three-dimensional model at least in the first display process.

An image processing apparatus according to a fifteenth aspect is the image processing apparatus according to any one of the first to fourteenth aspects, in which the processor is configured to perform an acquisition process to acquire a plurality of images obtained by capturing images of the building, the plurality of images having different date and time of capture from the plurality of images stored in the memory; and an association process to associate the acquired plurality of images with the members in the three-dimensional model stored in the memory.

An image processing apparatus according to a sixteenth aspect is the image processing apparatus according to the fifteenth aspect, in which the processor is configured to perform the association process on the basis of a correlation between the acquired plurality of images and the plurality of images stored in the memory.

An image processing method according to a seventeenth aspect of the present invention is an image processing method performed by an image processing apparatus including a processor and a memory storing a plurality of images obtained by capturing images of a building and a three-dimensional model of the building, the plurality of images and members constituting the building in the three-dimensional model being stored in association with each other. The image processing method includes causing the processor to perform an extraction step of extracting defect information of the building on the basis of the plurality of images; a selection step of selecting an image corresponding to a member designated in the three-dimensional model from among the plurality of images in accordance with a designated criterion; and an output step of outputting the designated member, the selected image, and the defect information in association with each other. The image processing method according to the seventeenth aspect may further have a configuration similar to that of the second to sixteenth aspects.

An image processing program according to an eighteenth aspect of the present invention causes a computer to execute the image processing method according to the seventeenth aspect. A non-transitory recording medium storing computer-readable codes of the image processing program according to the eighteenth aspect can also be presented as an aspect of the present invention.

BRIEF DESCRIPTION OF THE DRAWINGS

FIG. 8 is a diagram illustrating an example of defect information;

FIG. 9 is a diagram illustrating setting of criteria for selecting representative images.

FIG. 11 is a diagram illustrating a two-dimensional inspection report containing representative images and defect information;

DESCRIPTION OF THE PREFERRED EMBODIMENTS

An embodiment of an image processing apparatus, an image processing method, and an image processing program according to the present invention is as follows. In the description, reference is made to the accompanying drawings as necessary.

Embodiment

[Configuration of Image Processing System]

Figure 1:
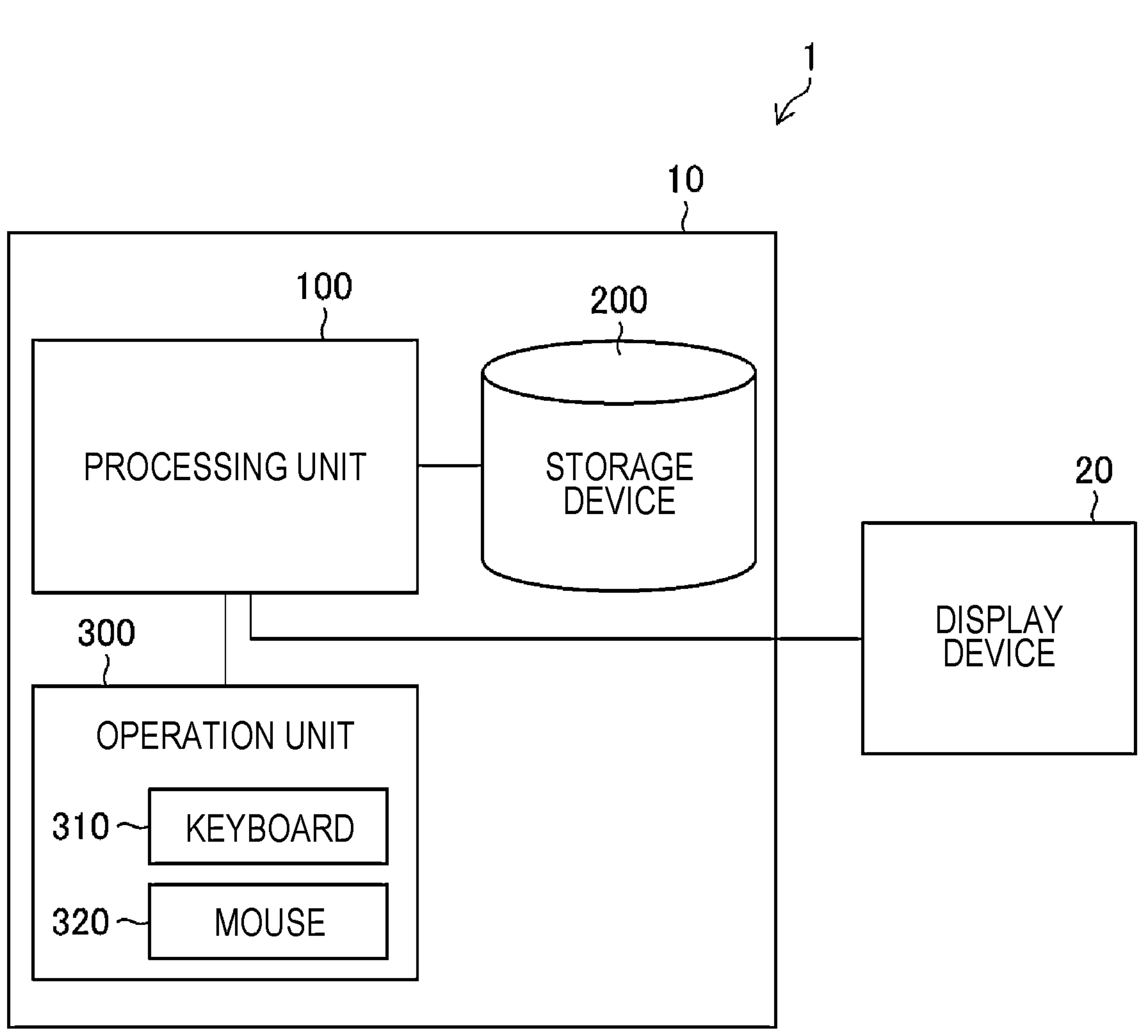
FIG. 1 is a diagram illustrating a schematic configuration of an image processing system according to an embodiment.

FIG. 1 is a block diagram illustrating a schematic configuration of an image processing system 1 (image processing apparatus). The image processing system 1 is a system including an image processing apparatus 10 (image processing apparatus) and a display device 20 (display device; monitor) and configured to extract defect information from a plurality of images acquired by capturing images of parts of a photographic subject, create a three-dimensional model, support creation of a two-dimensional inspection report, and perform other processing. The image processing system 1 can be configured using a device (information terminal) such as a personal computer, a tablet terminal, or a smartphone. The elements of the image processing system 1 may be housed in a single housing or may be housed in independent housings. Alternatively, the elements may be arranged in separate locations and connected to each other via a network.

[Configuration of Image Processing Apparatus]

The image processing apparatus 10 includes a processing unit 100, a storage device 200, and an operation unit 300, and these units are connected to each other to transmit and receive necessary information.

[Configuration of Processing Unit]

Figure 2:
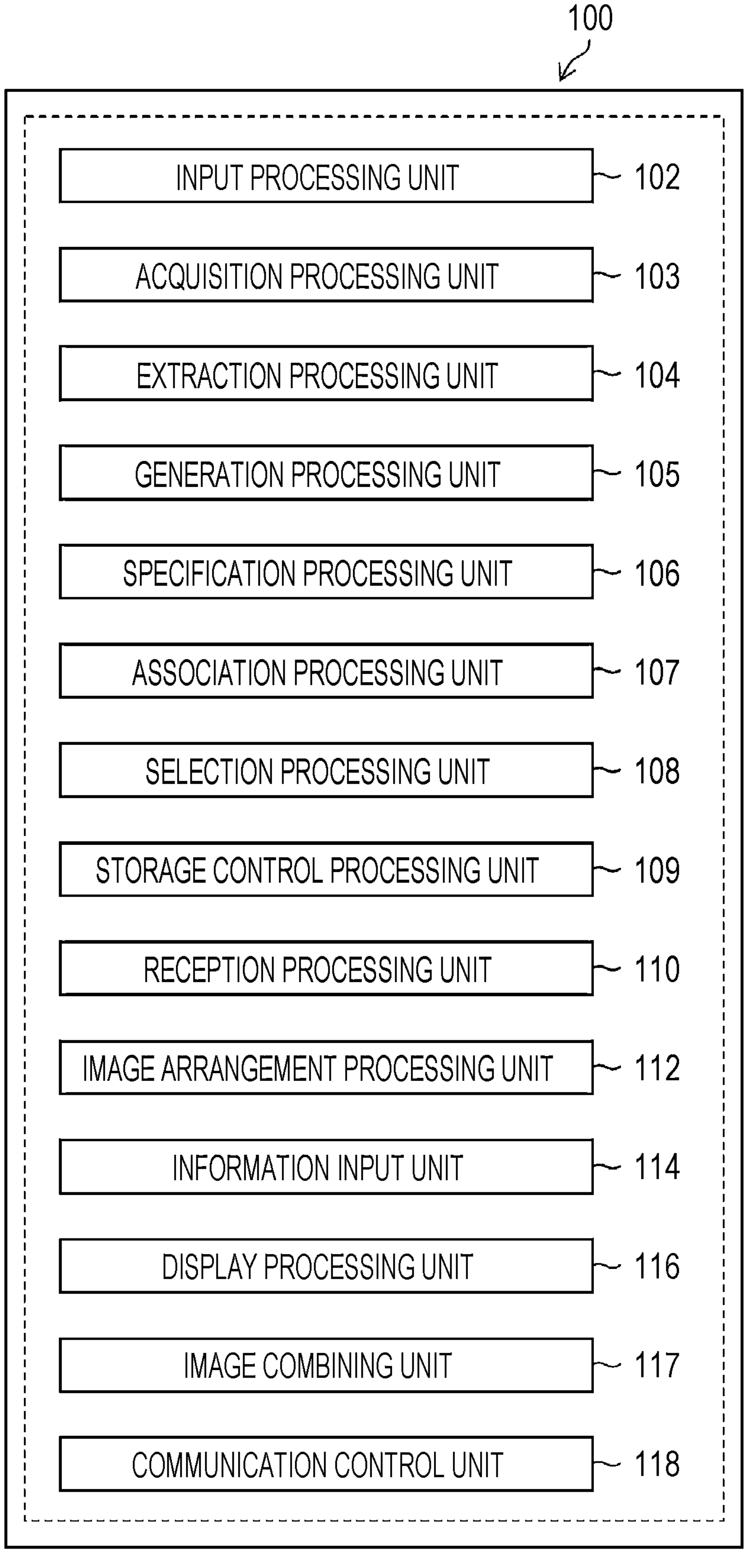
FIG. 2 is a diagram illustrating a functional configuration of a processing unit.

FIG. 2 is a diagram illustrating a configuration of the processing unit 100 (processor). The processing unit 100 includes an input processing unit 102, an acquisition processing unit 103, an extraction processing unit 104, a generation processing unit 105, a specification processing unit 106, an association processing unit 107, a selection processing unit 108, a storage control processing unit 109, a reception processing unit 110, an image arrangement processing unit 112, an information input unit 114, a display processing unit 116, an image combining unit 117, and a communication control unit 118, and is configured to acquire captured images, create a three-dimensional model, support creation of a two-dimensional inspection report, and perform other processing. Details of processes performed by these units will be described below.

The functions of the processing unit 100 described above can be implemented using various processors and a recording medium. The various processors also include, for example, a central processing unit (CPU), which is a general-purpose processor that executes software (program) to implement various functions, a graphics processing unit (GPU), which is a processor specialized in image processing, and a programmable logic device (PLD) such as a field programmable gate array (FPGA), which is a processor whose circuit configuration is changeable after manufacture. Each function may be implemented by one processor, or may be implemented by a plurality of processors of the same type or different types (for example, a plurality of FPGAs, a combination of a CPU and an FPGA, or a combination of a CPU and a GPU). Alternatively, a plurality of functions may be implemented by one processor. More specifically, the hardware structure of the various processors is an electric circuit (circuitry) in which circuit elements such as semiconductor elements are combined.

When the processor or electric circuit described above executes software (program), codes of the software to be executed, which are readable by a computer (for example, various processors and electric circuits constituting the processing unit 100, and/or a combination thereof), are stored in a non-transitory recording medium (memory) such as a ROM, and the computer refers to the software. At the time of execution, information stored in the storage device is used as necessary. At the time of execution, for example, a RAM (Random Access Memory; memory) is used as a temporary storage area.

A part of or all of the functions of the processing unit 100 may be implemented by a server on a network, and the image processing apparatus 10 may input data, perform communication control, display a result, and perform other processing. In this case, an Application Service Provider system including the server on the network is constructed.

[Configuration of Storage Unit]

Figure 3:
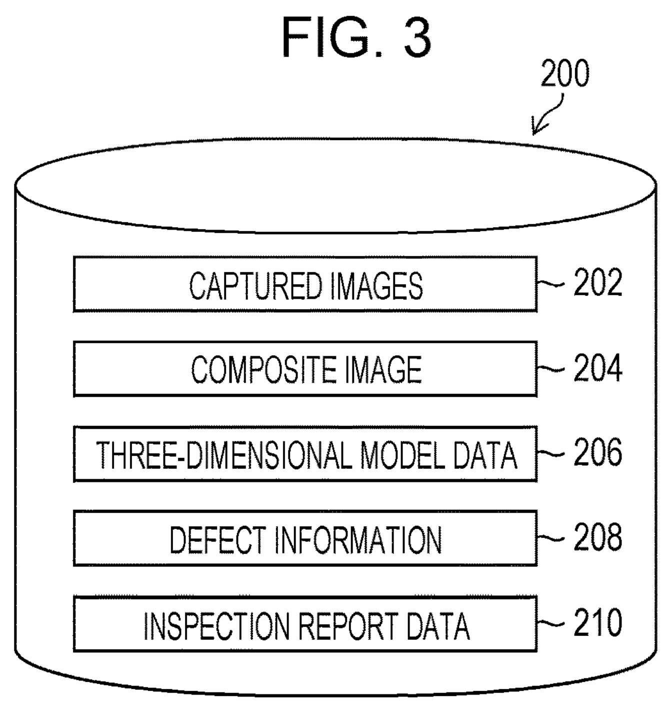
FIG. 3 is a diagram illustrating information stored in a storage device.

The storage device 200 (storage device; memory) is constituted by a non-transitory recording medium such as a compact disk (CD), a digital versatile disk (DVD), a hard disk, or various semiconductor memories, and a control unit thereof, and stores pieces of information illustrated in FIG. 3 in association with each other. Captured images 202 are a plurality of images obtained by capturing images of a building, and a composite image 204 is a combined image (a set of images) corresponding to a specific member, which is generated from the captured images. Three-dimensional model data 206 (three-dimensional model) is a three-dimensional model of the building, which is created on the basis of the captured images, and members constituting the building are specified. The three-dimensional model data 206 is associated with captured images, representative images, a two-dimensional inspection report, and the like. As will be described in detail below, a user can designate a piece of position information on the three-dimensional model to display a representative image and the two-dimensional inspection report. Defect information 208 (defect information) is information indicating defects of the building, which are extracted from the captured images. Inspection report data 210 is a template of a two-dimensional inspection report (a document file in a designated format) or data obtained by arranging and entering representative images and defect information in the template (described below). The template may be a format defined by the Ministry of Land, Infrastructure, Transport and Tourism of Japan or the local government.

In addition to the pieces of information described above, camera parameters (such as a focal length, an image size of an image sensor, and a pixel pitch) necessary when Structure from Motion (SfM) described below is applied may be stored in the storage device 200.

[Configuration of Operation Unit]

The operation unit 300 includes a keyboard 310 and a mouse 320. The user can use these devices to perform operations necessary for image processing according to the present invention. With the use of a touch panel device, the display device 20 may be used as an operation unit.

[Display Device]

The display device 20 (display device) is a device such as a liquid crystal display, for example, and is capable of displaying information on the captured images, the defect information, the three-dimensional model, the two-dimensional inspection report, the representative images, and the like that are acquired.

[Procedure of Image Processing]

Figure 4:
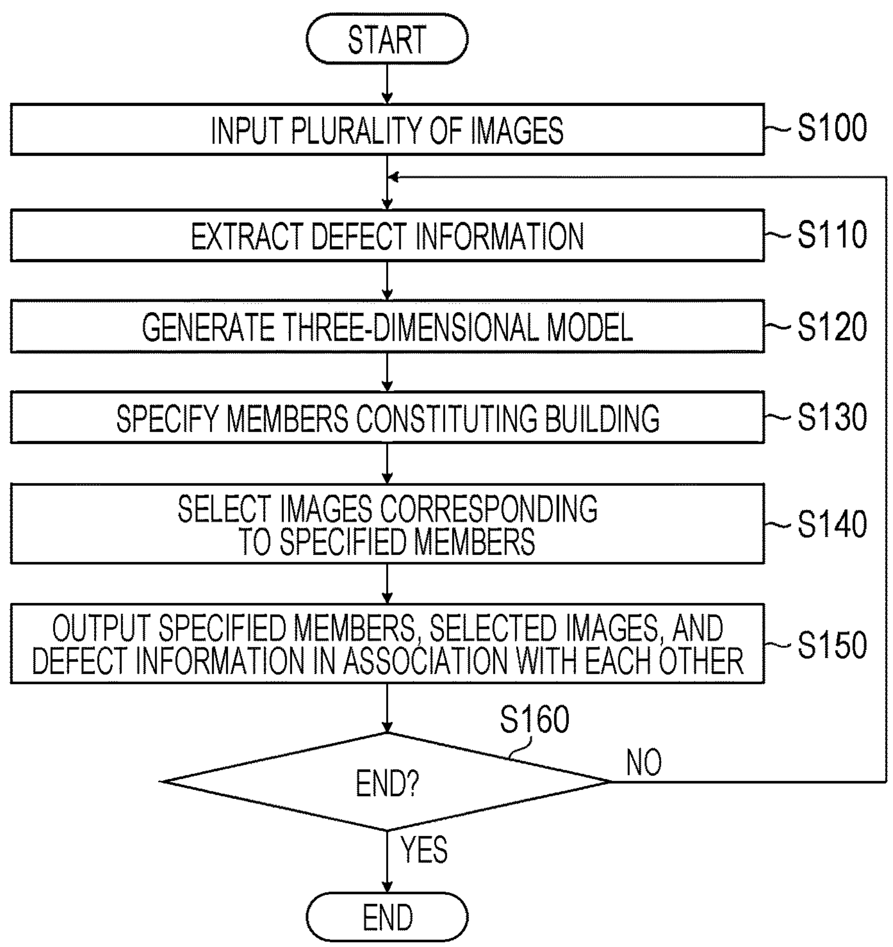
FIG. 4 is a flowchart illustrating processing of an image processing method.

FIG. 4 is a flowchart illustrating a procedure of an image processing method according to the present invention.

[Input of Images]

Figure 5:
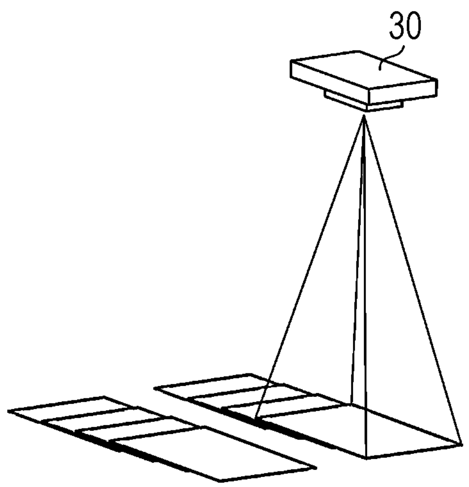
FIG. 5 is a diagram illustrating how an image group is acquired.

The input processing unit 102 (processor) inputs a plurality of images obtained by capturing images of a building as a photographic subject (step S100: input process or input step). The building (architectural object or structure) is, for example, a bridge, a road, or the like, or may be another building. The input processing unit 102 may input images stored in the storage device 200 as the captured images 202, or may input images via a recording medium or a network (not illustrated). These images can be captured by a flying object such as a drone, a robot having a moving function, or the like with movement of the viewpoint (or may be captured by the user). The images to be captured need not be stereo images. It is preferable that images have a large number of common feature points to create a three-dimensional model and combine the images. Thus, it is preferable that adjacent images overlap each other sufficiently (for example, 80% or more of the areas). FIG. 5 is a diagram illustrating how such overlapping images are captured with a camera 30.

[Extraction of Defects]

The extraction processing unit 104 (processor) extracts defect information of the building on the basis of the plurality of input images (step S110: extraction process or extraction step). In the extraction process, the extraction processing unit 104 can extract at least one of the type of a defect, the number of defects, the size of the defect, the degree of the defect, or the change in the degree of the defect over time as defect information.

The extraction processing unit 104 can extract the defect information using various methods. For example, a cracking detection method described in JP4006007B or a method for detecting rust and scale described in JP2010-538258A can be used. Alternatively, the extraction processing unit 104 can extract the defect information using a machine learning method. For example, a learning machine such as a deep neural network (DNN) is generated by machine learning using, as training data, images to which types, sizes, or the like of defects are assigned as labels, and defects can be detected using the generated learning machine.

The extraction processing unit 104 may extract defect information from each individual captured image and combine corresponding pieces of information into one piece, or may extract defect information from one image obtained by combining a plurality of captured images. Defects can be represented as vectors each having a start point and a termination point. In this case, as described in WO2017/110279A, a hierarchical structure between the vectors may be taken into account.

FIG. 8 is a diagram illustrating an example of defect information that is extracted. The extraction processing unit 104 can store the extracted defect information in the storage device 200 as the defect information 208.

[Creation of Three-Dimensional Model]

Figure 6:
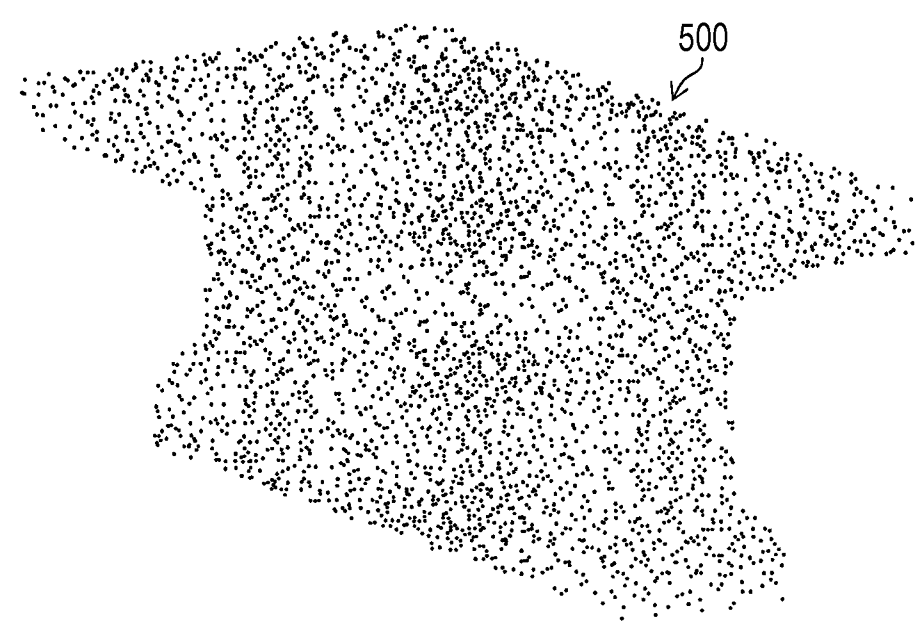
FIG. 6 is a diagram illustrating an example of three-dimensional point cloud data.

The generation processing unit 105 (processor) creates a three-dimensional model of the building on the basis of the plurality of input images (step S120: generation process or generation step). The three-dimensional model includes various models, such as a three-dimensional point cloud model, a three-dimensional surface model or a three-dimensional polygon model created on the basis of a three-dimensional point cloud model, and a model obtained by subjecting an image to texture mapping. The generation processing unit 105 can create the three-dimensional model using, for example, a Structure from Motion (SfM) method. SfM is a method of restoring a three-dimensional shape from multi-view images. For example, feature points are calculated by an algorithm such as scale-invariant feature transform (SIFT), and three-dimensional positions of a point cloud are calculated using the principle of triangulation with the calculated feature points as clues. Specifically, straight lines are drawn from the camera to the feature points using the principle of triangulation, and the intersection point of two straight lines passing through the corresponding feature points is the restored three-dimensional point. This operation is performed for each of the detected feature points, and, as a result, the three-dimensional positions of the point cloud can be obtained. FIG. 6 is a diagram illustrating a point cloud 500 (an example point cloud).

While size is not calculated by SfM, it is possible to perform association with the actual scale by, for example, performing imaging with a scaler having a known dimension installed on the photographic subject.

The generation processing unit 105 applies, for example, a triangulated irregular network (TIN) model to the data of the point cloud obtained in the way described above to approximate the surface of the building with triangles, and can obtain a solid model (three-dimensional model) on the basis of the result. In the solid model, the three-dimensional shape of a building is constructed as a combination of three-dimensional members such as solid blocks. To obtain the solid model, the user may designate "which range of the point cloud belongs to the same plane" via the operation unit 300, and the generation processing unit 105 may use the result. Alternatively, the generation processing unit 105 may use an algorithm such as random sample consensus (RANSAC) to automatically generate the solid model without the user's operation. To generate the solid model, the generation processing unit 105 may use information on the three-dimensional positions, colors (R, G, and B), and luminance of the point cloud to calculate a change in these pieces of information.

[Use of Generated Three-Dimensional Model]

If a three-dimensional model has already been generated or acquired by previous examination or the like, the generation processing unit 105 may read the model. When such a generated three-dimensional model is used, the acquisition processing unit 103 can acquire a plurality of images obtained by capturing images of the building and having different dates and times of capture from the plurality of images stored in the storage device 200 (memory) (for example, images not used for generation of the three-dimensional model and having newer dates and times of capture than the stored images) (acquisition process or acquisition step). Further, the association processing unit 107 can associate the plurality of acquired images with the members of the three-dimensional model stored in the storage device 200 (association process or association step). The association processing unit 107 can perform the association process (association step) on the basis of, for example, a correlation between the plurality of acquired images and the plurality of images stored in the storage device 200.

[Specification of Members]

Figure 7:
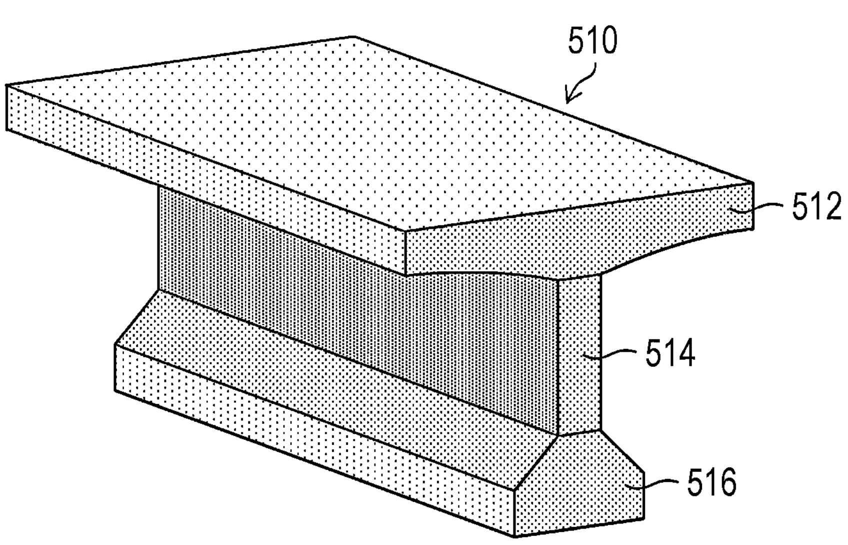
FIG. 7 is a diagram illustrating an example of a three-dimensional model.

The specification processing unit 106 (processor) specifies members constituting the building in the three-dimensional model (step S130: specification process or specification step). That is, the specification processing unit 106 specifies "to which member of the building each region of the three-dimensional model corresponds". The specification processing unit 106 may specify the members in accordance with the user's operation or may specify the members without an operation of the user specifying the members. When specifying a member, the specification processing unit 106 may use information on the shape and dimensions of the member. For example, information such as information indicating that "a member extending two-dimensionally in a horizontal plane and having an area equal to or greater than a threshold is a floor slab" or information indicating that "a member attached to a floor slab and extending one-dimensionally is a main girder" can be used. Further, the specification processing unit 106 may specify the members using a learning machine such as a DNN configured by machine learning in which members constituting a three-dimensional model are given as correct labels. FIG. 7 is a diagram illustrating an example of a three-dimensional model in which members are specified. In the illustrated example, a three-dimensional model 510 of a bridge is constituted by members, namely, a floor slab 512, a wall 514, and a leg 516.

The storage control processing unit 109 can store data indicating the generated three-dimensional model in the storage device 200 as the three-dimensional model data 206 (storage control process or storage control step).

[Selection of Representative Images]

The point cloud described above is information indicating the positions of the feature points included in the captured images. Since the members are specified in step S130, a captured image corresponding to each member can be specified. However, a very large number of images are usually acquired for each member to create a three-dimensional model, and it is time-consuming for the user to select an image. In the image processing system 1, accordingly, the reception processing unit 110 receives the designation of criteria for selecting an image (step S140: reception process or reception step), and the selection processing unit 108 (processor) selects images (representative images) corresponding to the specified members from among the captured images in accordance with the criteria (step S140: selection process or selection step).

Figure 9:
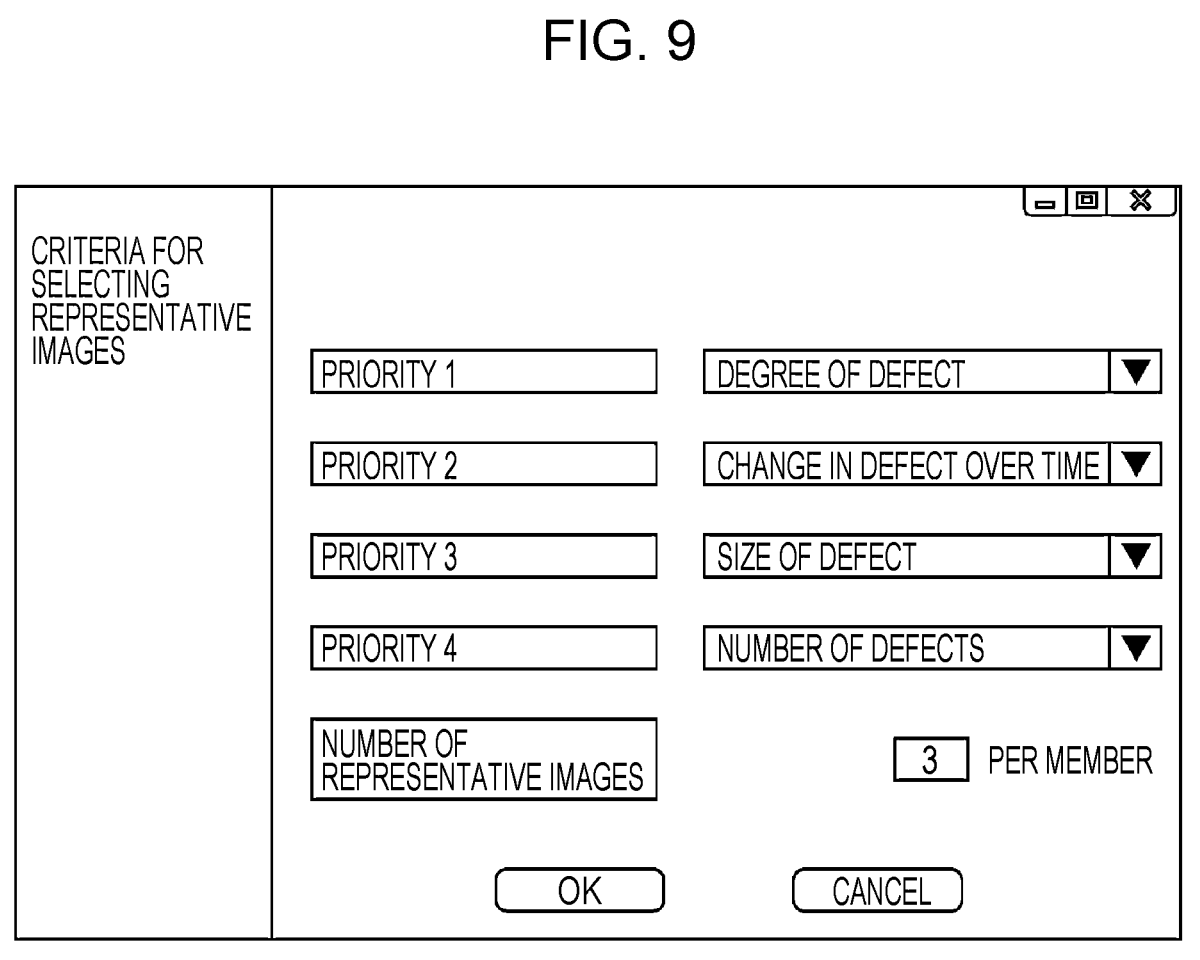

FIG. 9 is a diagram illustrating setting of criteria for selecting representative images, and the reception processing unit 110 causes the display device 20 to display such a screen. In the example in FIG. 9, the reception processing unit 110 sets priorities for information items (the number of defects, the size of a defect, the degree of the defect, and the change in the degree of the defect over time) included in the defect information in accordance with the user's operation. Further, the reception processing unit 110 sets the number of representative images to be selected (one or a plurality of representative images) in accordance with the user's operation. Based on the settings, the selection processing unit 108 selects a designated number of images in accordance with the set priorities. Accordingly, the user is able to quickly and easily select representative images. The setting illustrated in FIG. 9 is an example of setting of selection criteria, and representative images may be selected on the basis of other criteria (such as image quality of a captured image, a type of a member, and an identification number of a member, for example).

[Output of Processing Result]

Figure 10:
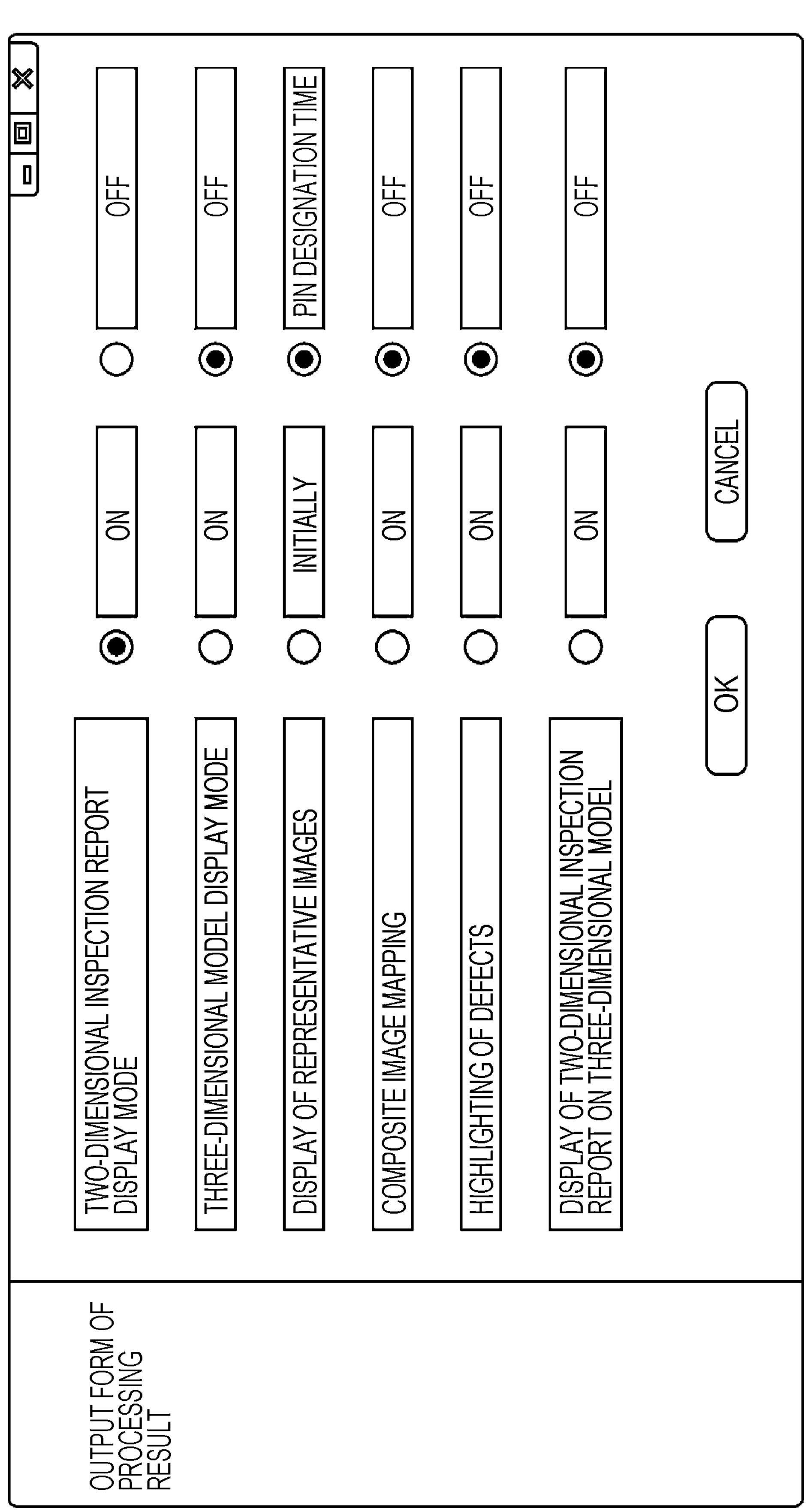
FIG. 10 is a diagram illustrating setting of the output form of a processing result.

FIG. 10 is a diagram illustrating setting of the output form of a processing result. In the illustrated example, the user can select radio buttons and input numerical values via the operation unit 300 to select whether to display a two-dimensional inspection report, whether to display a three-dimensional model, the timing of displaying representative images, whether to map a composite image, whether to highlight defects, and whether to display the two-dimensional inspection report on the three-dimensional model. In accordance with the settings, the image arrangement processing unit 112, the information input unit 114, and the display processing unit 116 individually or cooperatively output the specified members, the selected images, and the defect information in association with each other (step S150: output process or output step). The processing from steps S110 to S150 can be repeatedly performed until the determination to end the process is affirmed in step S160. The setting of the output form and the output in the set form can be performed at a timing desired by the user. For example, after a processing result is displayed in a certain mode, the processing result can be displayed again in a different mode. The details of each output form will be described hereinafter.

[Part 1: Output Using Two-Dimensional Inspection Report]

FIG. 11 illustrates an example of a two-dimensional inspection report (an example of a "document file having a designated format") in which the image arrangement processing unit 112 arranges representative images (representative images 552, 554, 556, and 558) in areas (image areas) designated as areas where images are to be arranged. In FIG. 11, the representative image 552 shows a blister 552A, and the representative image 554 shows a scale 554A. A report in this format may have multiple pages. In the example in FIG. 11, the information input unit 114 further inputs picture numbers, member names, element numbers, and defect information such as the types and degrees of defects to areas designated as information areas in the document file (information input process or information input step). The contents of the "note" column may be automatically input by the information input unit 114 on the basis of the defect information, or may be input in accordance with the user's operation. The display processing unit 116 causes the display device 20 to display such a screen when the "two-dimensional inspection report display mode" is ON in the screen in FIG. 10. Further, the display processing unit 116 causes information corresponding to the screen to be stored as the inspection report data 210.

Various formats of documents and layouts of representative images are conceivable. For example, documents such as inspection reports may be in a format defined by the Ministry of Land, Infrastructure, Transport and Tourism of Japan, the local government, or the like, or may be in any other format. Documents in other specified formats, other than inspection reports, may be used. The representative images may be sorted using members as keys and arranged in the document, or the representative images of the respective members may be sorted using the types of defects as keys (for each type of defect) and arranged.

Through the processes described above, the image processing system 1 enables the user to quickly and easily select representative images and create an inspection report. That is, the user is able to easily handle captured images of a building, a three-dimensional model of the building, and defect information.

[Part 2: Output Using Three-Dimensional Model]

Figure 12:
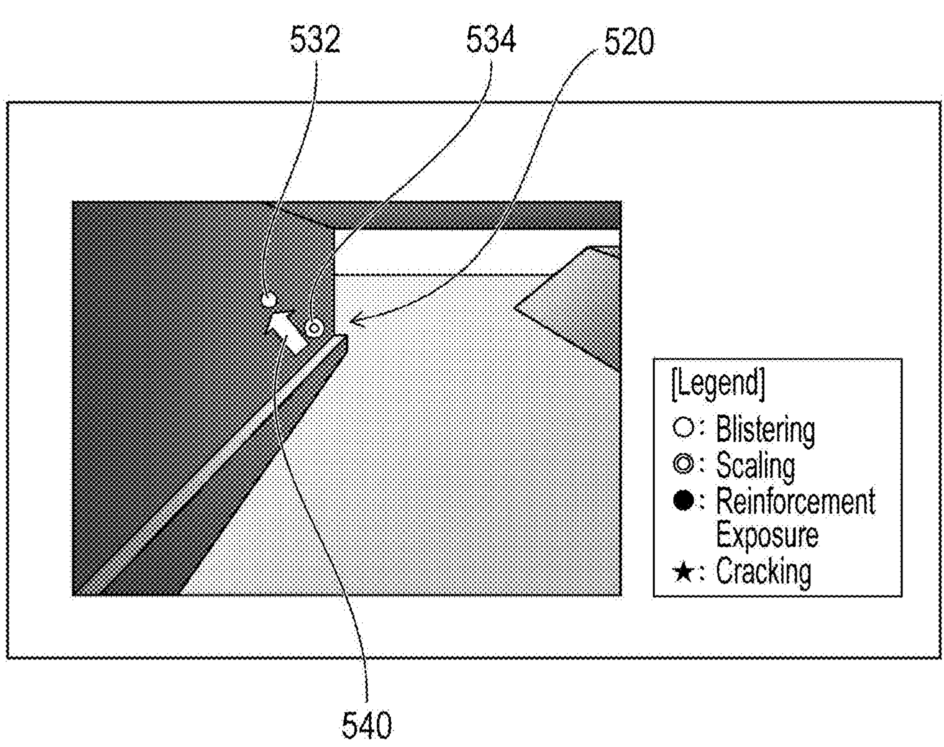
FIG. 12 is a diagram illustrating a three-dimensional model on which pieces of position information are displayed.

FIG. 12 is a diagram illustrating a three-dimensional model 520 and pins 532 and 534 (pieces of position information), which are displayed on a display device in association with each other (results of a first display process). The pins 532 and 534 indicate positions of selected images (representative images) in the three-dimensional model 520. When the timing of displaying representative images is "pin designation time" in FIG. 10, the pins are displayed at the positions of the representative images in the illustrated manner. In the example in FIG. 12, the three-dimensional model 520 displays a portion near a wall surface of a leg of a bridge. The display processing unit 116 can enlarge or reduce the size of the three-dimensional model in accordance with the user's operation performed via the operation unit 300, and can move the viewpoint or change the line-of-sight direction. When displaying the three-dimensional model 520, the display processing unit 116 may turn on or off the display of a specific member (for example, a member designated by the user). The display processing unit 116 performs such display when the "three-dimensional model display mode" is ON in FIG. 10. While a three-dimensional model without texture is illustrated in FIGS. 12 to 15, similar processing can be performed on a three-dimensional model with texture (see FIG. 16 and the description related thereto).

The display processing unit 116 may highlight the defect information on the three-dimensional model. For example, the display processing unit 116 may display defects such as cracks, blisters, or scales in such a manner that the defect or the contour thereof is depicted by a thick line or a prominent color line.

In the example in FIG. 12, the display processing unit 116 distinguishably displays the pins in a manner corresponding to the defect information. Specifically, the display processing unit 116 displays the pins 532, 534 using marks that are different depending on the type of defect. Alternatively, the display processing unit 116 may display the pins using different colors or numbers instead of marks, or may display the pins as icons. Alternatively, the display processing unit 116 may change the display form in accordance with the degree of defect. In the example in FIG. 12, for example, the user can use the mouse 320 to move a cursor 540 on the screen to select a pin (by clicking or the like).

Figures 13A, 13B:
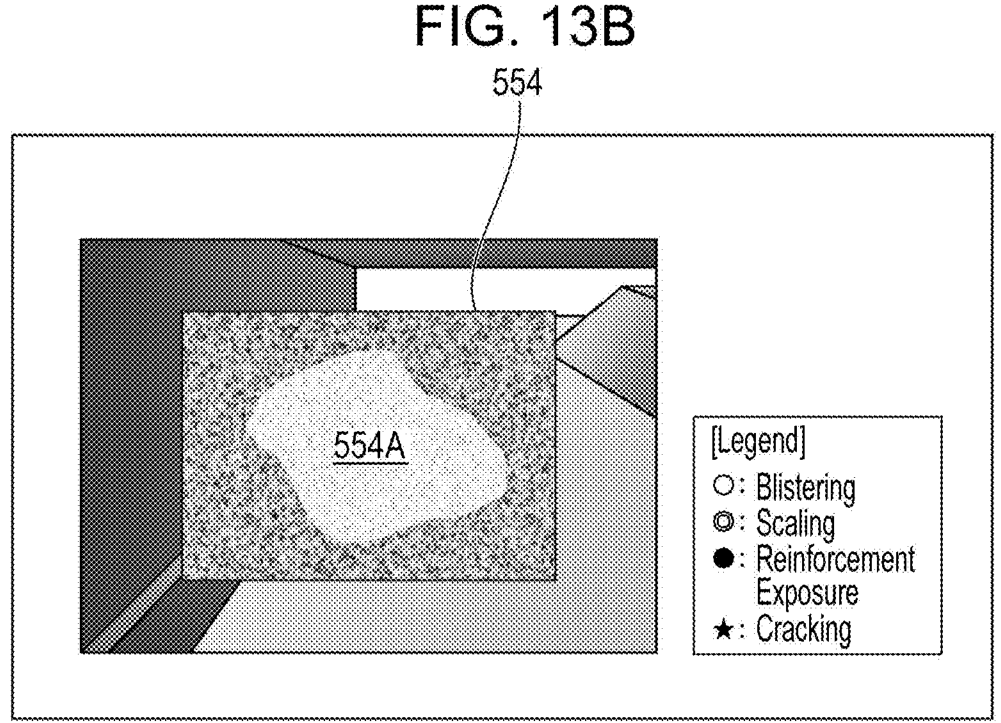
FIGS. 13A and 13B are diagrams illustrating states in which representative images corresponding to designated positions are displayed.

FIGS. 13A and 13B are diagrams illustrating states in which the display processing unit 116 causes the display device 20 to display representative images for designated ones of the pins (pieces of position information) displayed on the screen (results of a second display process). FIG. 13A illustrates a representative image 552 of a "blister", which is displayed in response to designation of the pin 532, and FIG. 13B illustrates a representative image 554 of a "scale", which is displayed in response to designation of the pin 534. The display processing unit 116 may display a representative image in an area different from that of the three-dimensional model, on a screen different from that of the three-dimensional model, or on a display device different from that of the three-dimensional model.

Figure 14:
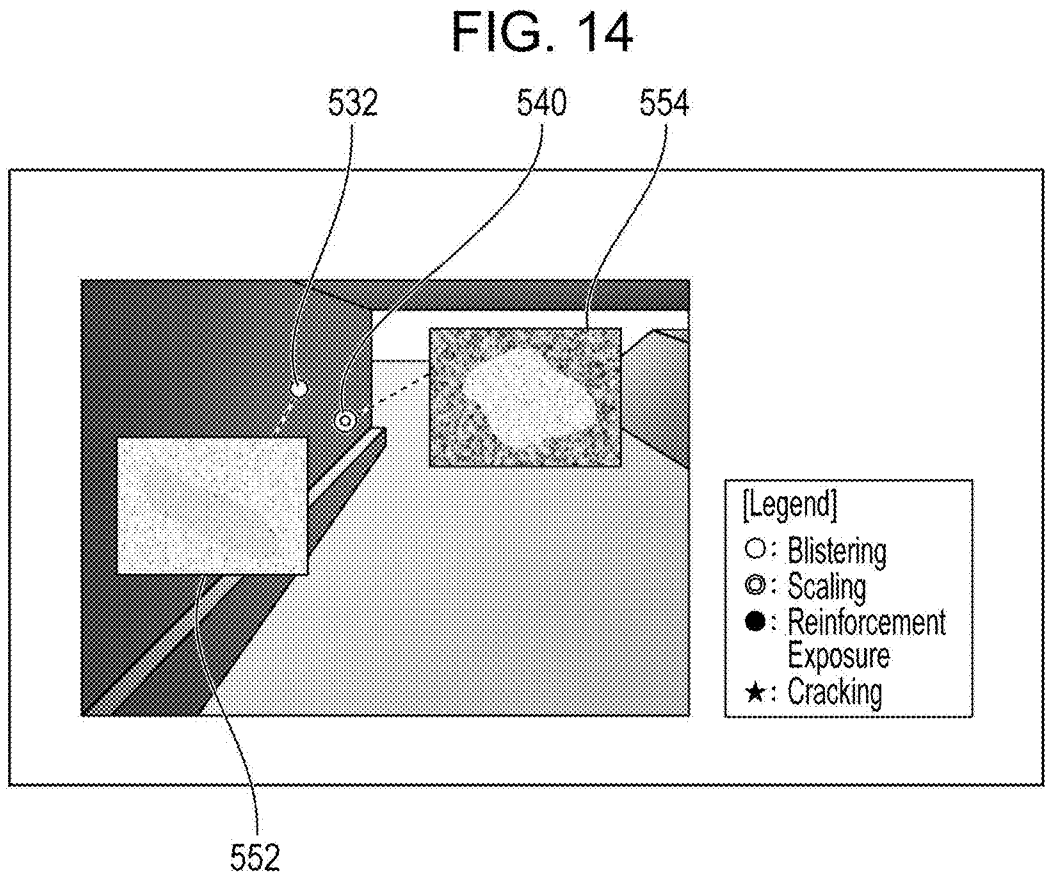
FIG. 14 is a diagram illustrating a state in which representative images are initially displayed.

FIG. 14 is a diagram illustrating a state in which representative images are initially displayed on the three-dimensional model (results of the first display process and a third display process). The display processing unit 116 performs such display when the timing of displaying representative images is set to "initially" in FIG. 10. In the example illustrated in FIG. 14, the pins 532 and 534 and the representative images 552 and 554 are connected by leader lines, which enables the user to easily grasp the relationship between the pins and the representative images. The representative images may be displayed in balloons connected to the respective pins.

Figure 15:
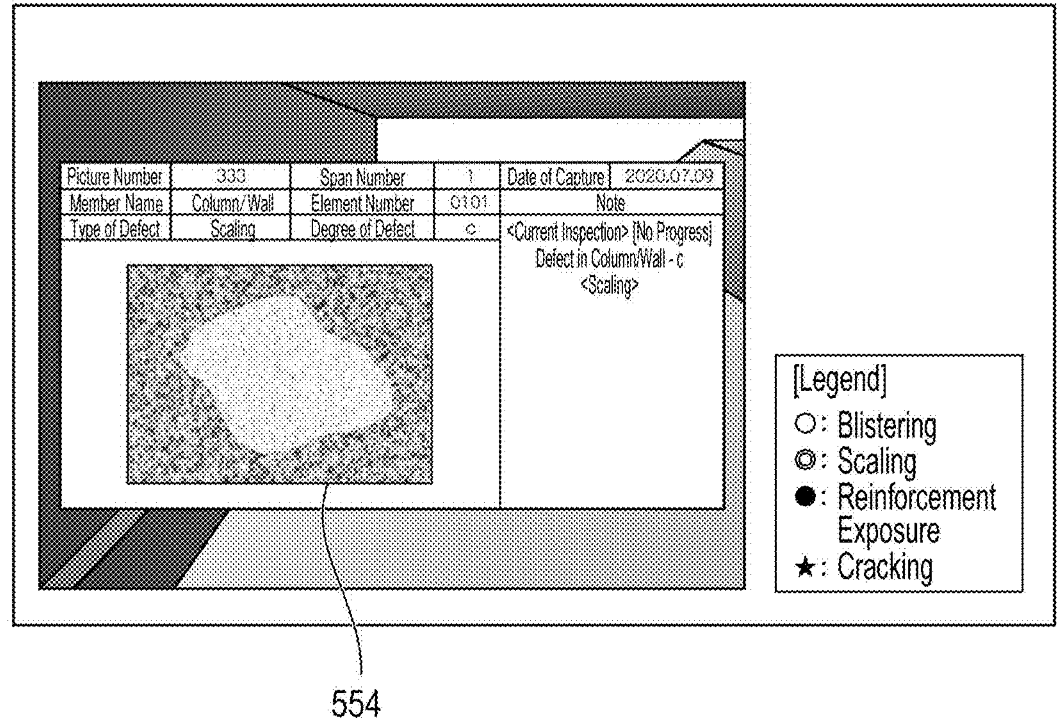
FIG. 15 is a diagram illustrating display of a portion of the two-dimensional inspection report including a representative image corresponding to a designated position.

FIG. 15 is a diagram illustrating the display of a portion of the two-dimensional inspection report including a representative image corresponding to a selected pin (results of a fourth display process). The display processing unit 116 can perform such display when "display of two-dimensional inspection report on three-dimensional model" is ON in FIG. 10. The display processing unit 116 may display such a portion of the two-dimensional inspection report in an area different from that of the three-dimensional model, on a screen different from that of the three-dimensional model, or on a display device different from that of the three-dimensional model.

Through such processing, the image processing system 1 enables the user to quickly and easily browse representative images and creation of an inspection report. That is, the user is able to easily handle captured images of a building, a three-dimensional model of the building, and defect information.

[Part 3: Mapping of Composite Image to Three-Dimensional Model]

Figure 16:
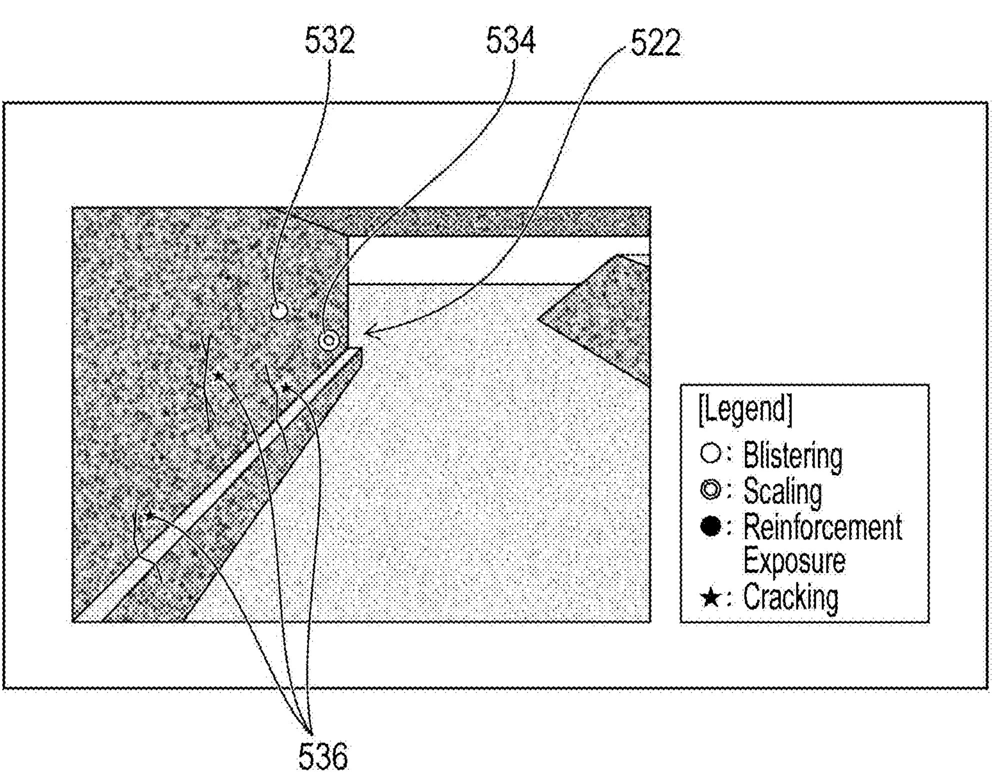
FIG. 16 is a diagram illustrating the three-dimensional model to which a composite image is mapped.

FIG. 16 is a diagram illustrating a three-dimensional model 522 displayed on the display device 20. The three-dimensional model 522 is obtained by mapping a composite image to the three-dimensional model 520 (see FIG. 12). Such a display is performed when the "composite image mapping" is ON in FIG. 10. In this form, an image combining unit 117 (processor) combines images corresponding to specified members among the plurality of captured images to produce a combined image, and the display processing unit 116 maps the combined image to the specified members and causes the display device 20 to display the resulting image (a fifth display process). The combining and mapping of images may be performed on some or all of the members of the building. In the example illustrated in FIG. 16, the display processing unit 116 distinguishably displays pieces of position information (displays pins 532, 534, and 536 with marks corresponding to the respective types of defects) in a manner similar to that in the form described above. The display processing unit 116 may display a representative image or a two-dimensional inspection report in accordance with selection of a piece of position information. In addition, defect information may be highlighted.

While FIG. 16 illustrates an example in which a composite image is generated separately and mapped to a three-dimensional model having only a three-dimensional shape, the generation processing unit 105 (processor) may directly generate a three-dimensional model with texture by SfM described above or the like. At this time, the generation processing unit 105 may use any other algorithm such as multi-view stereo (MVS). Because of providing more information than a single-view method, MVS can generate a more detailed three-dimensional model. Also for such a three-dimensional model with texture, display of pieces of position information and representative images, display of a portion of a two-dimensional inspection report, and highlighting of defect information may be performed in a manner similar to the forms described above with reference to FIGS. 12 to 15.

Through the processing described above, the image processing system 1 enables the user to easily handle images obtained by capturing images of a building, a three-dimensional model of the building, and defect information.

While an embodiment of the present invention has been described, the present invention is not limited to the embodiment described above, and various modifications may be made without departing from the spirit of the present invention.

REFERENCE SIGNS LIST

1 image processing system
10 image processing apparatus
20 display device
30 camera
100 processing unit
102 input processing unit
103 acquisition processing unit
104 extraction processing unit
105 generation processing unit
106 specification processing unit
107 association processing unit
108 selection processing unit
109 storage control processing unit
110 reception processing unit
112 image arrangement processing unit
114 information input unit
116 display processing unit
117 image combining unit
118 communication control unit
200 storage device
202 captured image
204 composite image
206 three-dimensional model data
208 defect information
210 inspection report data
300 operation unit
310 keyboard
320 mouse
500 point cloud
510 three-dimensional model
512 floor slab
514 wall
516 leg
520 three-dimensional model
522 three-dimensional model
532 pin
534 pin
536 pin
540 cursor
552 representative image
552A blister
554 representative image
554A scale
556 representative image

558 representative image

S100 to S160 steps of image processing method

What is claimed is:

1. An image processing apparatus comprising:

a processor; and a memory storing a plurality of images obtained by capturing images of a building and a three-dimensional model of the building in which members constituting the building are specified, the plurality of images and the members being stored in association with each other, wherein the processor is configured to perform:

an extraction process to extract defect information of the building on the basis of the plurality of images;

a selection process to select an image corresponding to a designated member from among the plurality of images in accordance with a designated criterion which is designated for priorities for information items included in the defect information, or image quality of a captured image, or a type of a member, or an identification number of a member;

an output process to output the designated member, the selected image, and the defect information in association with each other;

an image arrangement process to arrange the selected image in an area designated as an image area in a document file having a designated format; and an information input process to input the defect information to an area designated as an information area in the document file, wherein the processor is configured to specify the members using a learning machine configured by machine learning in which the members constituting a three-dimensional model are given as correct labels.

2. The image processing apparatus according to claim 1, wherein the processor is configured to perform:

a generation process to generate the three-dimensional model of the building on the basis of the plurality of images;

a specifying process to specify the members constituting the building in the generated three-dimensional model; and a storage control process to store the three-dimensional model in the memory in such a manner that the plurality of images and the specified members are associated with each other.

3. The image processing apparatus according to claim 2, wherein the processor is configured to perform the specifying process without an operation of a user specifying the members.

4. The image processing apparatus according to claim 1, wherein the processor is configured to perform a reception process to receive designation of the criterion.

5. The image processing apparatus according to claim 1, wherein the processor is configured to extract at least one of a type of a defect, the number of defects, a size of the defect, a degree of the defect, or a change in the degree of the defect over time as the defect information in the extraction process.

6. The image processing apparatus according to claim 1, wherein the processor is configured to select an image for each type of defect in the selection process.

7. The image processing apparatus according to claim 1, wherein the processor is configured to select a specified number of images in the selection process.

8. The image processing apparatus according to claim 1, wherein the processor is configured to perform:

a first display process to cause a display device to display the three-dimensional model and position information indicating a position of the selected image in the three-dimensional model in association with each other; and a second display process to cause the display device to display the selected image for designated position information among pieces of the displayed position information.

9. The image processing apparatus according to claim 1, wherein the processor is configured to perform:

a first display process to cause a display device to display the three-dimensional model and position information indicating a position of the selected image in the three-dimensional model in association with each other; and a third display process to cause the display device to display the selected image for the displayed position information.

10. The image processing apparatus according to claim 8, wherein the processor is configured to distinguishably display the position information in a form corresponding to the defect information at least in the first display process.

11. The image processing apparatus according to claim 8, wherein the processor is configured to, at least in the first display process, combine images corresponding to the specified members among the plurality of images to produce a combined image, and cause the display device to display the combined image with mapping to the specified members.

12. The image processing apparatus according to claim 8, wherein the processor is configured to highlight the defect information in the three-dimensional model at least in the first display process.

13. The image processing apparatus according to claim 1, wherein the processor is configured to perform:

an acquisition process to acquire a plurality of images obtained by capturing images of the building, the plurality of images having different date and time of capture from the plurality of images stored in the memory; and an association process to associate the acquired plurality of images with the members in the three-dimensional model stored in the memory.

14. The image processing apparatus according to claim 13, wherein the processor is configured to perform the association process on the basis of a correlation between the acquired plurality of images and the plurality of images stored in the memory.

15. An image processing method performed by an image processing apparatus comprising a processor, and a memory storing a plurality of images obtained by capturing images of a building and a three-dimensional model of the building in which members constituting the building are specified, the plurality of images and members constituting the building in the three-dimensional model being stored in association with each other, the image processing method comprising causing the processor to perform:

extracting defect information of the building on the basis of the plurality of images;

selecting an image corresponding to a member designated in the three-dimensional model from among the plurality of images in accordance with a designated criterion which is designated for priorities for information items included in the defect information, or image quality of a captured image, or a type of a member, or an identification number of a member;

outputting the designated member, the selected image, and the defect information in association with each other;

arranging the selected image in an area designated as an image area in a document file having a designated format; and inputting the defect information to an area designated as an information area in the document file, wherein the processor is configured to specify the members using a learning machine configured by machine learning in which the members constituting a three-dimensional model are given as correct labels.

16. A non-transitory computer readable recording medium storing an image processing program for causing a computer to execute the image processing method according to claim 15.

17. The image processing method of claim 15, wherein the document file is a file of a two-dimensional inspection report.

18. The image processing apparatus according to claim 1, wherein the document file is a file of a two-dimensional inspection report.

* * * * *